United States Patent
Lagrou et al.

[11] Patent Number: 5,876,086
[45] Date of Patent: Mar. 2, 1999

[54] MULTI-PIECE DOOR WITH HIDDEN HINGE

[75] Inventors: James P. Lagrou, Rochester Hills; Douglas A. Rozier, Lathrup Village, both of Mich.

[73] Assignee: The Budd Company, Troy, Mich.

[21] Appl. No.: 834,629

[22] Filed: Apr. 14, 1997

[51] Int. Cl.[6] .................................................. B62D 25/00
[52] U.S. Cl. ..................... 296/146.11; 246/51; 246/56; 246/50
[58] Field of Search .............................. 296/146.11, 51, 296/56, 50

[56] References Cited

U.S. PATENT DOCUMENTS

| | | | |
|---|---|---|---|
| 2,374,697 | 5/1945 | Palisano et al. | 296/106 |
| 4,815,164 | 3/1989 | Rottinghaus | 296/146.11 |
| 4,955,659 | 9/1990 | Kosugi | 296/146.11 |
| 5,095,582 | 3/1992 | Ohlsson | 296/106 |
| 5,491,875 | 2/1996 | Siladke et al. | |

OTHER PUBLICATIONS

Sales Brochure for "The 1997 Chevrolet Commercial Vehicles" Jul. 1996, p. 29.
Sales Brochure for "The 1997 Chevy Express /Chevy Van" Jul. 1996, p. 5.

*Primary Examiner*—Gary C. Hoge
*Attorney, Agent, or Firm*—Harness, Dickey & Pierce, P.L.C.

[57] ABSTRACT

In accordance with the teachings of the present invention, there is provided a door closure apparatus for covering a single opening in a vehicle body. The apparatus including a first door, a second door and a third door, each door being pivotally supported by hinges which are concealed from view when the first, second, and third doors are in a closed position.

12 Claims, 6 Drawing Sheets

MULTI-PIECE DOOR WITH HIDDEN HINGE

BACKGROUND OF THE INVENTION

1. Technical Field

This invention generally relates to a vehicle closure apparatus and, more particularly, to a closure apparatus having multiple doors with concealed hinges for covering a single opening in a vehicle body.

2. Discussion

One advantage of having a large vehicle, such as a van, minivan, or sport utility vehicle, is that a large cargo area is available for carrying cargo. In order to fully utilize this cargo area, a large opening is generally provided in the vehicle body so that objects which would not fit through the traditional door openings of a vehicle can be loaded into the cargo area. A noted disadvantage of having a large opening in the vehicle body is the fact that a large door must be provided to cover the opening. Traditionally within the automotive industry these doors, or closures, as they are often referred to, have been placed at the rear of the vehicle and are generally a one or two piece design.

Initially, two-piece designs were used in which there were either two horizontal doors or two vertical doors. Typically, vertical doors were utilized on cargo vans or full sized passenger vans while horizontal doors were utilized on station wagons and were typically a clam shell type opening.

One-piece doors, typically referred to as a liftgate, have been used with increasing frequency on sport utility type vehicles and minivans. The liftgate is typically hinged along the top portion of the door which generally coincides with the roof line at the rear of the vehicle. The liftgate typically extends from the roof line to a point just above the rear bumper and pivots upwardly so that the liftgate is overhead when fully opened.

Several disadvantages of the liftgate are the room required behind the vehicle in order to open the liftgate, and the weight of the liftgate itself. Since the liftgate is a single piece basically running from the roof line down to the bumper level, a fairly large amount of clearance is required behind the vehicle in order to provide clearance for the liftgate to swing from a closed position to an open position. This condition often requires the user to move the vehicle away from other vehicles which have been parked behind it so that the liftgate can be opened. The one-piece liftgate also limits how close the vehicle can be parked to an opening (such as a garage door) when items are being unloaded from the cargo area.

Further, since the liftgate is a large single piece unit often incorporating a rear window, a rear window wiper, and a wiper motor, the weight of the liftgate can be considerable. The effect of the weight of the liftgate can be compensated for by providing hydraulic lifts or struts to assist the operator in opening the liftgate. However, the force of the lifts must then be overcome in order to close the liftgate thereby increasing the effort required to lower the liftgate. The struts are generally designed to provide enough lifting force that even if they wear or some of the internal pressure bleeds down over time they will still provide sufficient force to assist in lifting and holding the liftgate in the open position. Therefore, when the struts are new the force which must be overcome can be significant.

Another disadvantage of one-piece liftgates is the height of the liftgate when it is in the open position. Some people find the liftgate handle, which may pivot down when the liftgate is open or may be fixed to the liftgate structure, difficult to reach while at the same time others find that there is insufficient head clearance when they walk underneath the liftgate.

Several disadvantages of the two-piece vertical door systems utilized on cargo vans and full size vans is the physical limitation presented to the vehicle stylist in trying to soften the look of the rear of the vehicle. Fundamental kinematics of the motion of the doors and the hinging required to support the doors limits the tumble home, or slope, a two-piece vertical door system is allowed to have from the roof line to the lower window portion of the vehicle. This lower window portion is often referred to as the belt line of the vehicle. With ever increasing emphasis on reduced coefficient of drag and aerodynamic performance, stylists have tended toward having an increased tumble home at the rear of the vehicle. By utilizing the two full height vertical doors for the rear opening of the vehicle the ability to increase the tumble home is limited. Further, many automotive stylists wish to increase the rear tumble home in order to provide a more aesthetically pleasing side view of the vehicle such that the rear of the vehicle has character lines which are coordinated with the sloping front ends of many new vehicles.

SUMMARY OF THE INVENTION

In accordance with the teachings of the present invention, there is disclosed a vehicle closure apparatus consisting of three doors used to cover a single opening in the vehicle body. The three doors generally include two vertical doors and a single horizontal door. The vertical doors are hinged at the outboard edge of the vehicle, with each typically extending to the centerline of the vehicle. The single horizontal door is pivoted about a line parallel to the roof or floor of the vehicle and typically extends to the belt line or lower edge of the window area. The hinges for each of the doors are concealed from view when the doors are in a closed position thereby providing an aesthetically pleasing appearance and providing enhanced aerodynamic performance. The hinges of at least the two vertical doors incorporate a door check device which holds the doors in a selected open position until a force greater than a predetermined threshold is exerted on the door which will either force the door to a more closed position or a more open position. The hinges of the present invention provide for the vertical doors to be opened to an angle of 180 or more degrees from the closed position.

BRIEF DESCRIPTION OF THE DRAWINGS

The various advantages of the present invention will become apparent to one skilled in the art upon reading the following specification and by reference to the drawings in which.

DETAILED DESCRIPTION OF THE PREFERRED EMBODIMENTS

The following description of the preferred embodiments is merely exemplary in nature and is in no way intended to limit the invention or its application or uses.

Figure 1:
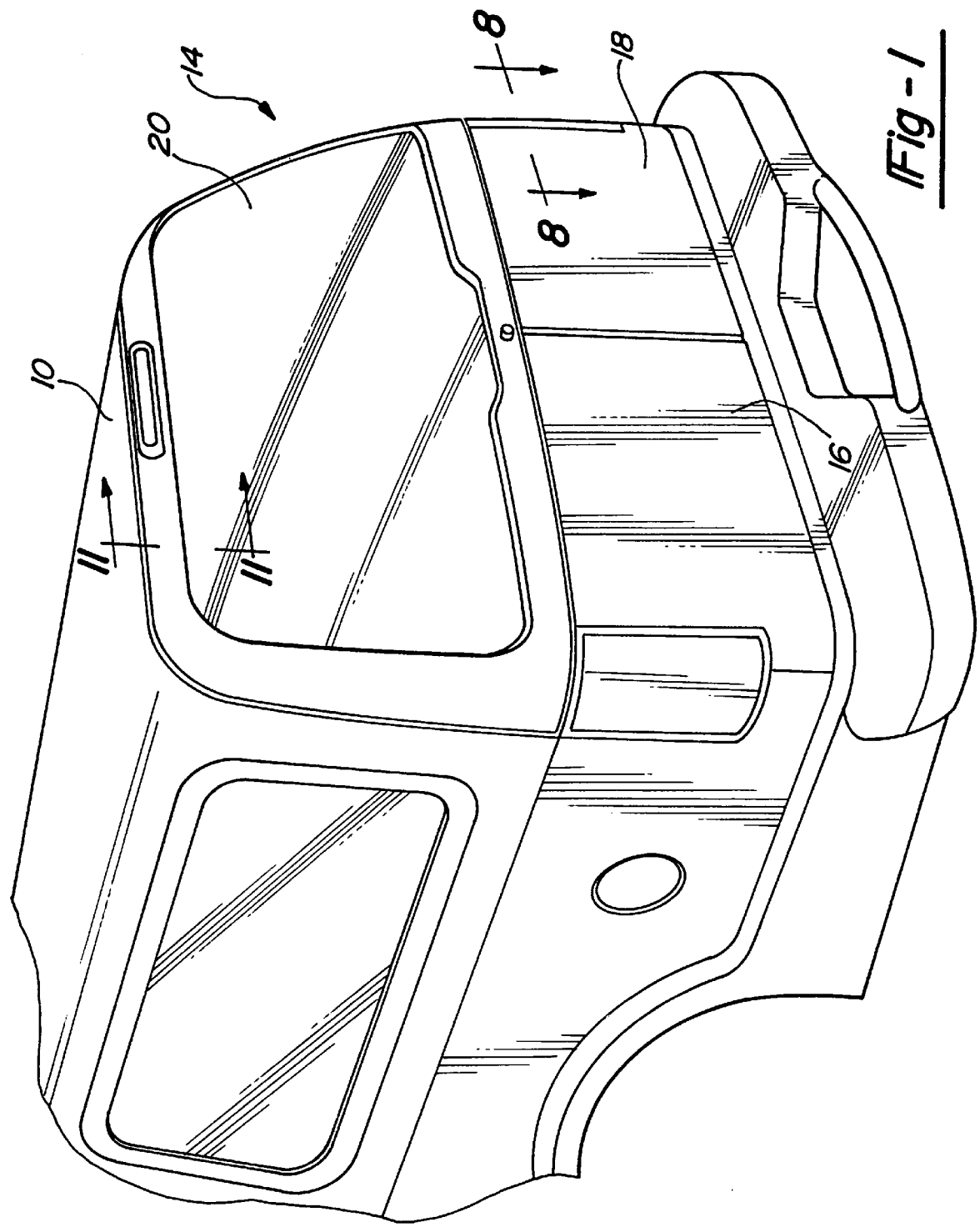
FIG. 1 is a partial perspective view of a vehicle incorporating a vehicle closure apparatus made in accordance with the teachings of the present invention.
Figure 2:
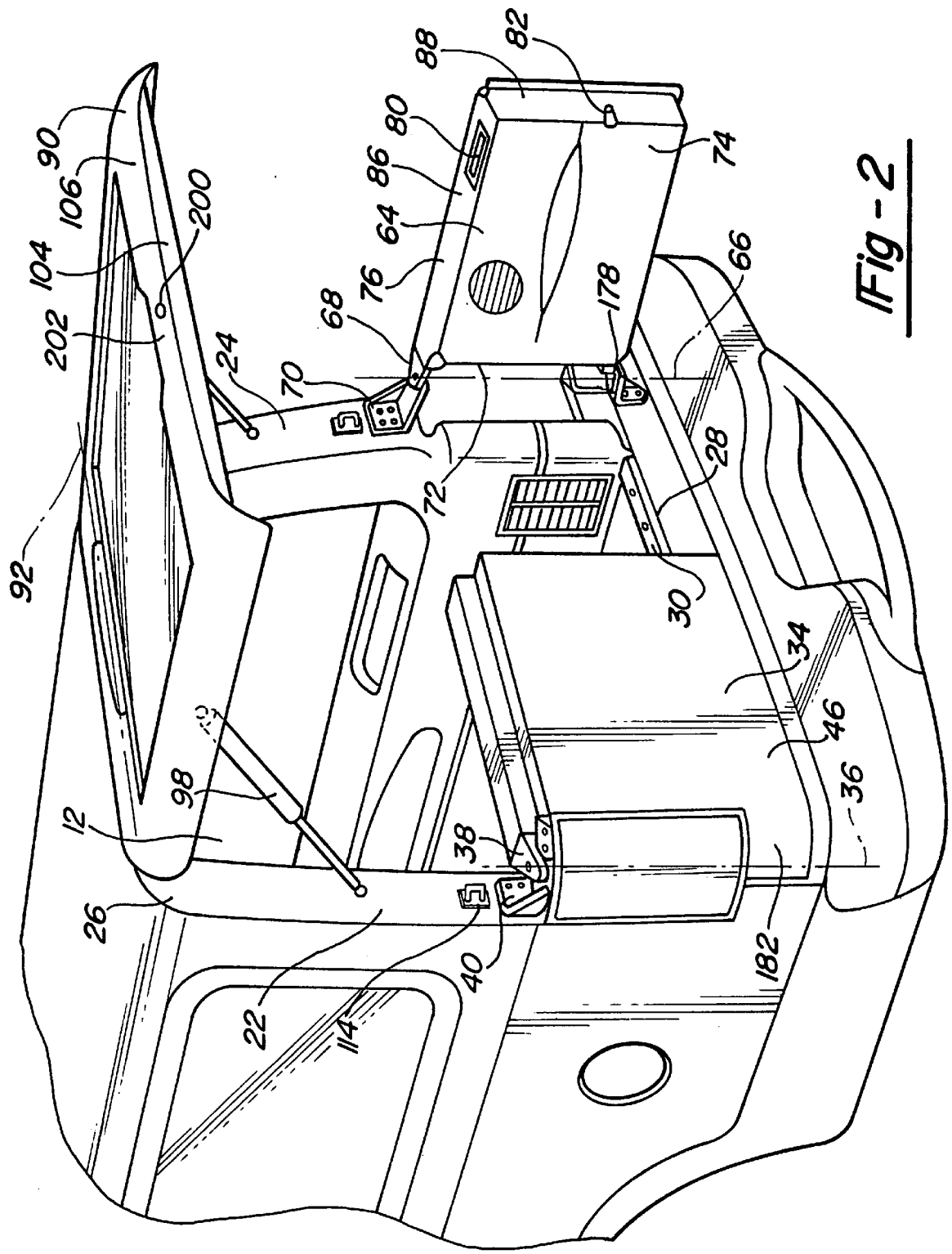
FIG. 2 is a partial perspective view similar to FIG. 1 wherein the vehicle closure apparatus is shown in a partially open condition.

Referring to FIGS. 1 and 2, there is shown a vehicle body generally at 10 having an opening 12 near the rear of the vehicle. A vehicle closure apparatus 14 is shown to include a first door 16, a second door 18, and a third door 20.

Opening 12 in the following disclosure is generally defined by the inboard edges of the driver side D-pillar structure 22, and the passenger side D-pillar structure 24, as well as the lower edge of the vehicle rear header 26 and the upper edge of the vehicle floor pan 28, or the rear sill scuff plate 30 which is attached to floor pan 28. While the preferred embodiment will be described relative to a rear opening, it is not limited to such an application and can equally be used in other locations such as side openings.

Figure 3:
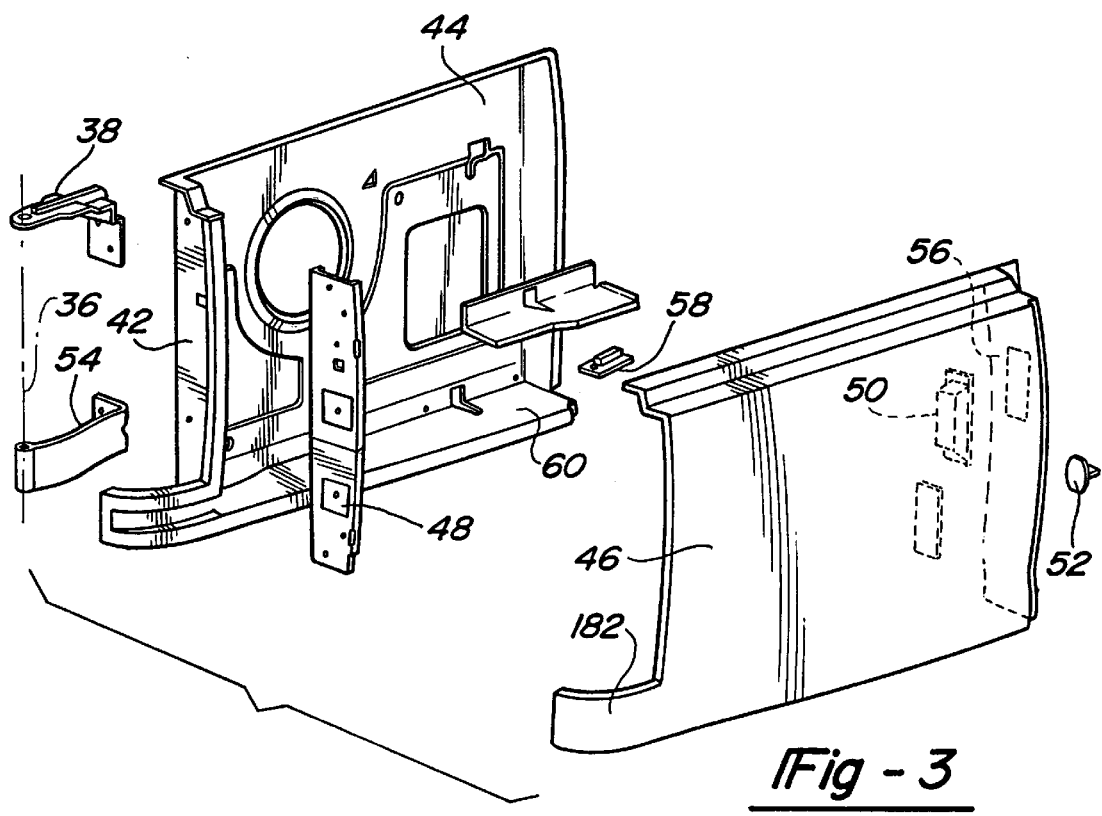
FIG. 3 is an exploded perspective view of a driver side vertical door member of the present invention.

Referring to FIGS. 2 and 3, first door 16 is a first vertical door member 34 having a first vertical pivot axis 36 about which first hinge crank 38 and first hinge base 40 pivot relative to one another. Hinge crank 38 is attached to a first vertical side 42 of door member 34 while hinge base 40 is attached to D-pillar structure 22. As best shown in FIG. 3, door member 34 is made of a door inner panel 44, a door outer panel 46, hinge attachment reinforcement 48, secondary door opening handle 50, and door latch striker 52. Reinforcement 48 is generally coordinated with and fastened to first vertical side 42 and provides a structurally sound attachment area for hinge crank 38 and for a first lower hinge crank 54. The present embodiment preferably uses a sheet molded compound for door inner panel 44 such that a reinforcement, like that shown as reinforcement 48, is traditionally required. It should be noted that depending upon the material selected (i.e., steel, aluminum, resin plastics) in forming door inner panel 44, reinforcement 48 may not be required, or alternately localized reinforcement pads (not shown) may be incorporated to locally reinforce the door inner panel. Door outer panel 46 is then attached to door inner panel 44. Secondary door opening handle 50 is shown attached to a second vertical side 56 which is opposite to first vertical side 42. Linkages (not shown) extend from secondary handle 50 to latch mechanism 58 such that door member 34 may be latched in a closed position. In the present embodiment latch mechanism 58 engages floor pan 28 along a lower edge 60 of door member 34. Door latch striker 52 is fastened to the second vertical side 56 and provides an engagement location for fastening second door 18 as will be described.

Figure 4:
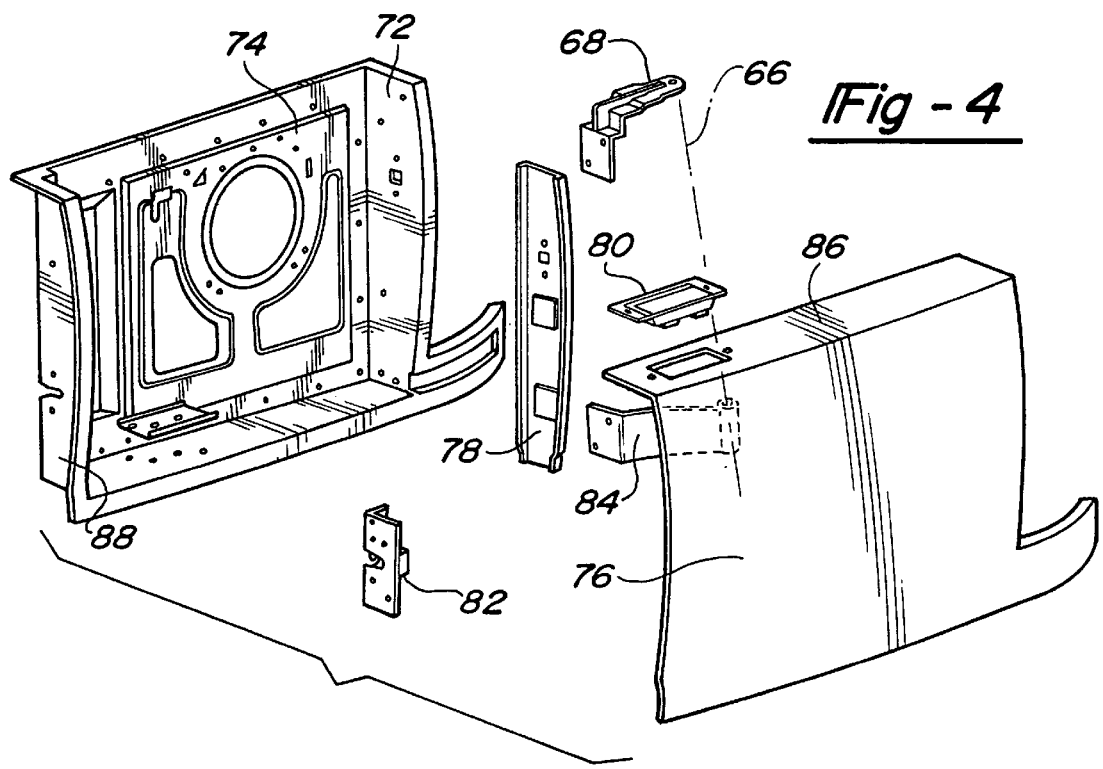
FIG. 4 is an exploded view of a passenger side vertical door member to be coordinated with the driver side vertical door member of FIG. 3.

Referring to FIGS. 2 and 4, second door 18 is a second vertical door member 64 having a second vertical pivot axis 66 about which second hinge crank 68 and second hinge base 70 pivot relative to one another. Hinge crank 68 is attached to a first vertical side 72 of door member 64 while hinge base 70 is attached to D-pillar structure 24. As best shown in FIG. 4, door member 64 is made of a door inner panel 74, a door outer panel 76, hinge attachment reinforcement 78, primary door opening handle 80, and door latch mechanism 82. Reinforcement 78 is generally coordinated with and fastened to first vertical side 72 of door member 64 and provides a structurally sound attachment area for second hinge crank 68 and for a second lower hinge crank 84. Again, the present embodiment preferably uses a sheet molded compound for door inner panel 74 such that a reinforcement is typically required. As before, the material selection of door inner panel 74 will dictate the size and type of reinforcement utilized, if any. Door outer panel 76 is then attached to door inner panel 74. Primary door opening handle 80 is shown attached to an upper edge 86 of door member 64. Linkages (not shown) extend from primary door opening handle 80 to latch mechanism 82 such that door member 64 may be latched in a closed position relative to door latch striker 52 on first door member 34. Latch mechanism 82 is attached to a second vertical side 88 which is opposite to first vertical side 72, second side 88 of door member 64 being adjacent to second side 56 of door member 34 when each are in a closed position.

Figure 5:
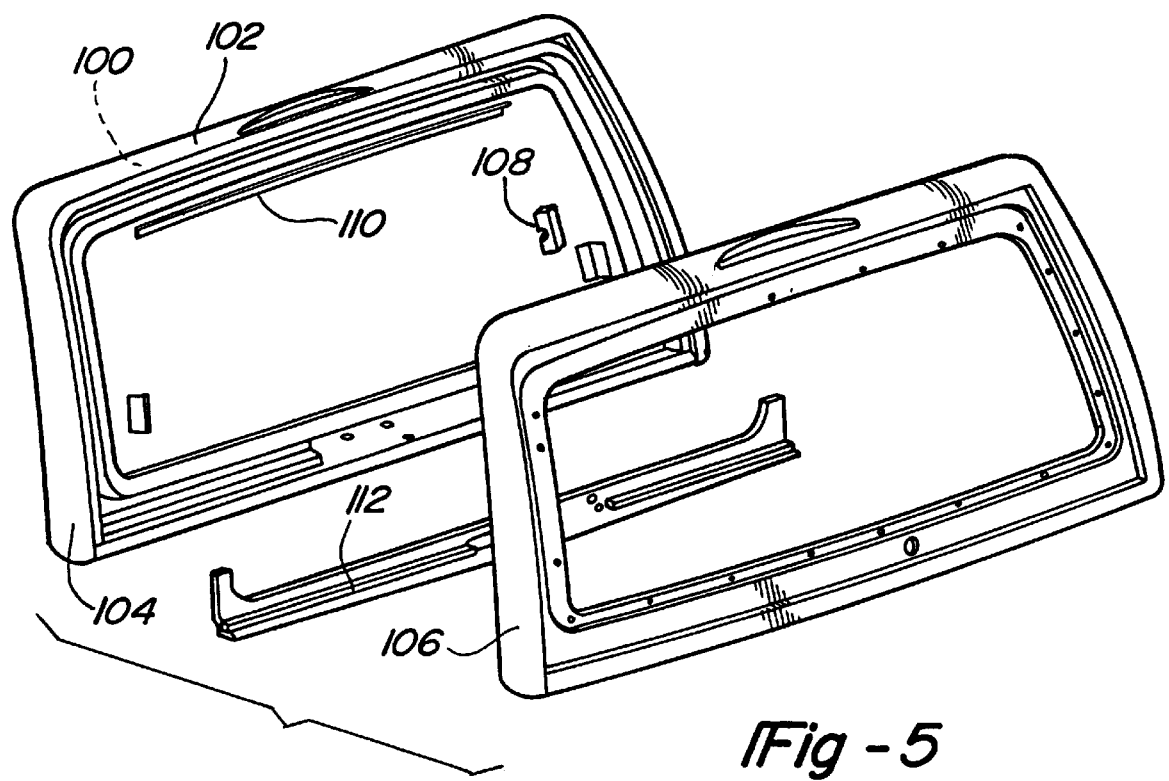
FIG. 5 is an exploded view of a horizontal door member made in accordance with the teachings of the present invention which is to be coordinated with the vertical door members of FIGS. 3 and 4.

Referring now to FIGS. 2 and 5, third door 20 is a horizontal door member 90 having a horizontal pivot axis 92 about which horizontal hinge cranks 94 and horizontal hinge bases 96 pivot relative to one another. Hinge cranks 94 are attached to an upper portion 102 of inner surface 100 of door member 90 while hinge bases 96 are attached to rear header 26. As best shown in FIG. 5, horizontal door member 90 is made of a door inner panel 104, a door outer panel 106, door latch mechanisms 108, and may include a hinge attachment reinforcement 100, and a wiper system attachment reinforcement 112. A door release system is also included in door member 90 and is connected via linkages or electronically to solenoids (not shown) which disengage door latch mechanisms 108 from strikers 114 located on D-pillars 22 and 24, (shown in FIG. 2).

Further, in order to assist in opening horizontal door member 90, strut members 98 are pivotally attached to D-pillar structures 22 and 24 at one end, and to inner surface 100 of horizontal door member 90 at the opposite end. Struts 98 also provide support to hold horizontal door member 90 in position after it has been raised to the open position.

Figure 6:
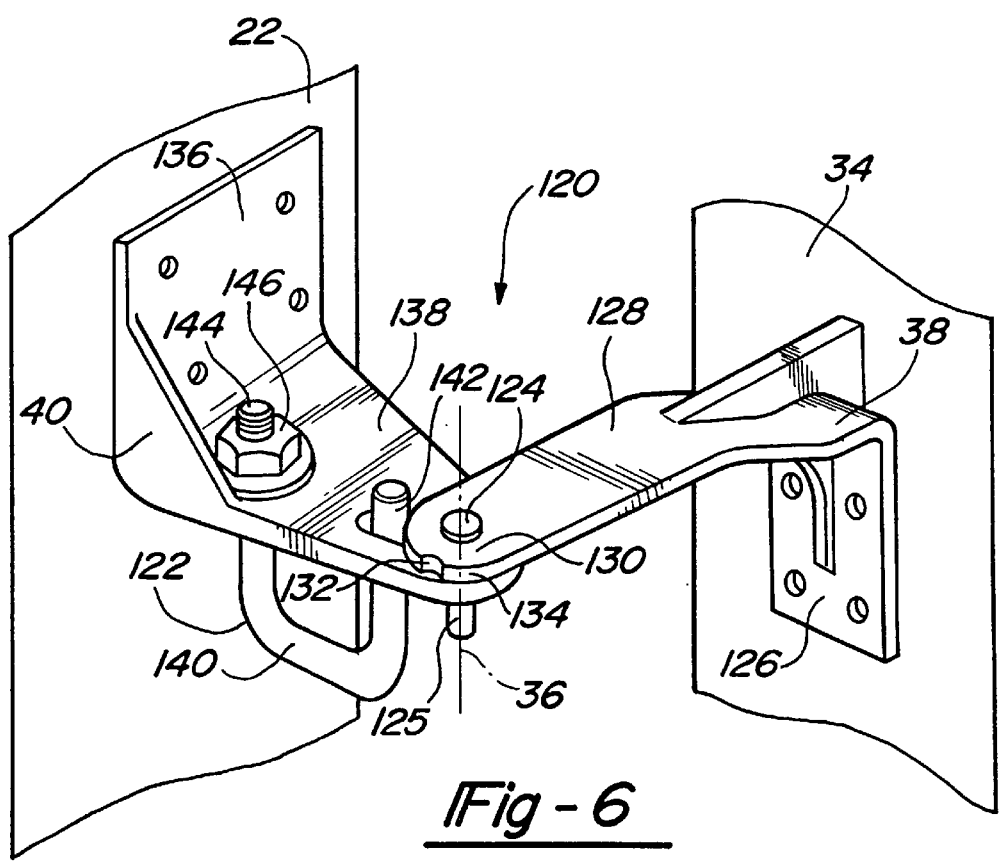
FIG. 6 is a detailed view of a hinge mechanism incorporating an integral door check device made in accordance with the teachings of the present invention.

Having observed the details of the structure of the doors of the present invention, attention may now be given to a preferred embodiment of a hinge assembly 120 incorporating an integral door check device 122. With reference to FIG. 6, hinge assembly 120, in addition to including door check device 122, further includes first hinge base 40, first hinge crank 38, and hinge pin 124. Hinge pin 124 is positioned such that its axis 125 is coincident with first vertical pivot axis 36. While hinge assembly 120 will be described in reference to an upper driver side hinge, the features of the hinge assembly equally apply to a passenger side hinge which is symmetrically opposite. Further, hinge assembly 120 can be positioned at an upper or a lower position on either the driver or passenger side in the present embodiment.

As shown, first hinge crank 38 includes a crank attachment segment 126 and a generally perpendicular projecting crank arm segment 128. Crank attachment segment 126 is coordinated with and fastened to first vertical side 42 of door member 34. The distal end 130 of crank arm segment 128 is generally radiused having its center of curvature coincident with axis 125. A notch or detent 132 is formed in the radiused surface 134 of crank arm segment 128.

First hinge base 40 includes a base attachment segment 136 which mates with and is attached to D-pillar structure 22. Hinge base 40 also includes a base arm segment 138 which extends generally perpendicular to base attachment segment 136. Door check device 122 is fastened to arm segment 138 and contacts radiused surface 134 of crank 38.

Integral door check device 122 is considered a friction-type door check as opposed to a roller-type door check. The present embodiment of the door check device 122 incorporates a generally U-shaped spring element 140. Spring 140 has a contact end 142 which is biased to contact radiused surface 134 of crank 38. Spring element 140 also includes an attachment end 144 which, as shown, is threaded to receive a nut 146 which retains attachment end 144 in a fixed position relative to hinge base 40.

As door member 34 is pivoted from a closed position to an open position contact end 142 exerts a force on and creates a friction with radiused surface 134 such that door member 34 experiences some resistance to pivotal movement. This resistance not only prevents door 34 from swinging to an open position too easily (and possibly hitting an object which would damage it) but it also provides the user with a perception of a smooth acting and solidly constructed mechanism.

When door member 34 has been rotated a predetermined angle, contact end 142 engages detent 132 by partially extending into the contour of detent 132. Door member 34 is therefore held in a selected open position which resists allowing the door member to close, possibly damaging the door or the object being loaded, or open a greater amount and possibly hitting another object. While detent 132 resists allowing door member 34 to open a greater amount, the resistance can be overcome by exerting a force greater than a predetermined threshold on door member 34, thereby forcing contact end 142 to pass over detent 132 and allow door member 34 to be opened a greater amount than the previously selected open position. The distance provided between vertical pivot axis 36 and first vertical side 42 of door member 34 is such that door member 34 can open to an angle of 180° or more from its closed position. As such, door member 34 (and second door member 64) can be opened to provide uninhibited access to the full width of opening 12 and allow vehicle 10 to be positioned closer to an object which is being loaded into the cargo area.

Further, because of the unique hinge configuration presented in the present invention vertical pivot axis 36 and 66 can be positioned outboard of the centerline of the vehicle a greater distance than conventional exposed hinge systems.

Figure 7:
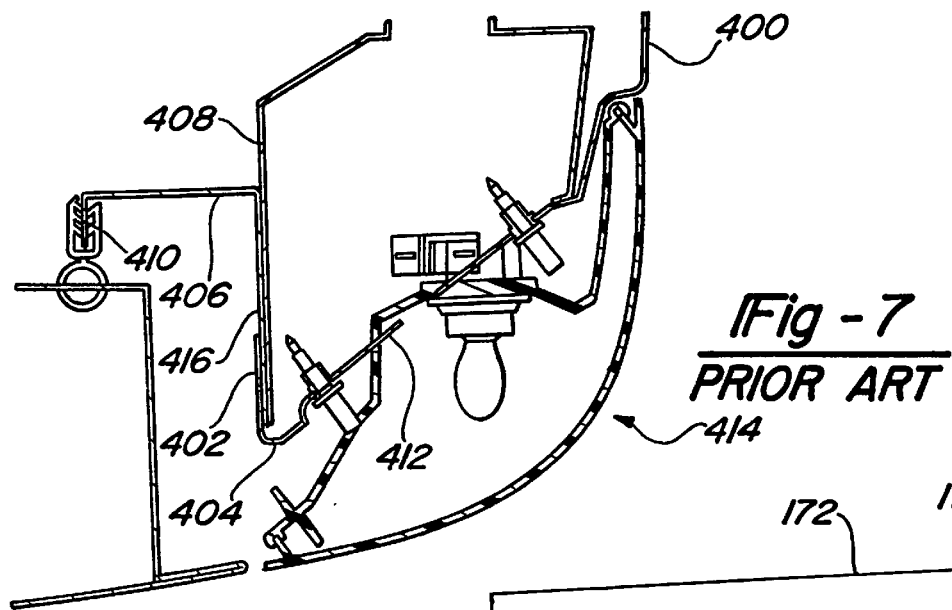
FIG. 7 is a cross sectional view of a prior art D-pillar area at a tail lamp unit.

As shown in FIG. 7, a prior art D-pillar in the tail lamp unit area includes a body side outer panel 400 extending rearward in vehicle and wrapping around the rear of the vehicle. The outer panel 400 generally provides a return flange 402 at a rearward end 404 to which an extension plate 406 is welded. A D-pillar inner panel 408 generally connects with the extension panel which presents a weld flange 410 either directed rearward in vehicle (as shown) or inboard in vehicle (not shown) depending upon the specific design configurations encountered. The portion of the body side outer panel 400 which wraps around the rear of the vehicle generally presents a recessed portion 412 which accepts a tail lamp unit 414 (typically located below the beltline of the vehicle). The hinge mechanism (not shown in this section) for a closure system in this prior art construction is attached to the inward facing surface 416 of extension plate 406 and provides a vertical pivot axis generally in line with surface 416.

Figure 8:
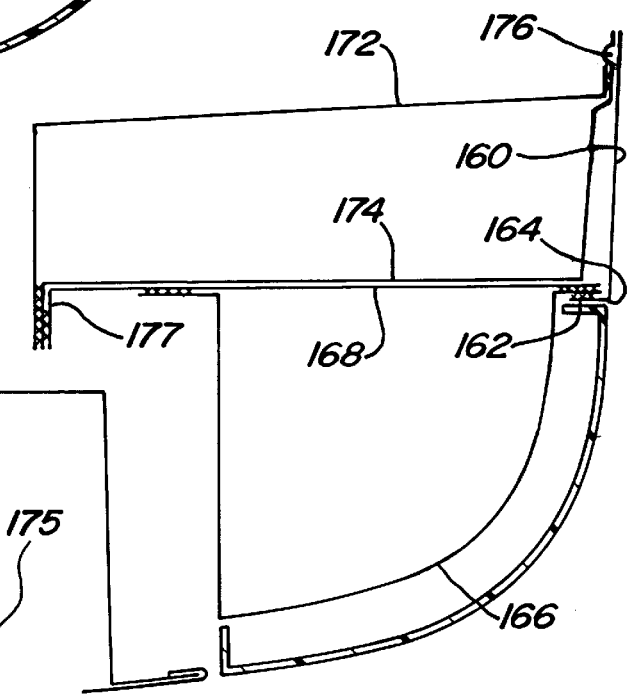
FIG. 8 is a cross section taken along line 8—8 in FIG. 1 showing the D-pillar area and tail lamp of the present invention.

The body side outer panel shown in FIG. 8 of the present invention is in stark contrast to the traditional body structure shown in FIG. 7 and just described. FIG. 8 shows that body side outer panel 160 does not extend rearward or provide a inwardly curving surface in which to attach a tail lamp assembly. Instead, material is saved and a weld flange 162 at the rear edge 164 of body side outer panel 160 is provided. The tail lamp support assembly 166 is attached to an inwardly extending extension plate 168. The subassembly of the extension plate 168 and tail lamp support 166 is then fastened to body side outer panel 160 at outboard attachment position 170. A D-pillar inner panel 172 and D-pillar outer panel 174 are attached to one another and the subassembly is then attached to the body side outer panel 160 at a forward attachment location 176 and to a rearwardly extending weld flange 177 of extension plate 168.

The tail lamp support 166 is vertically positioned so that it can be placed between an upper hinge assembly, such as hinge assembly 120, and a lower hinge assembly (shown best in FIG. 2). By positioning the tail lamp support 166 between the hinges, the vertical pivot axis can be moved outboard in vehicle over the tail lamp assembly (or theoretically passing through the tail lamp assembly) thereby allowing the doors to pivot clear of the outboard boundaries of opening 12. The hinge base attachment segment 136 is connected to the D-pillar outer panel 174 or is connected to extension plate 168 to which tail lamp support 166 is connected if extension plate 166 extends to that height.

Figure 9:
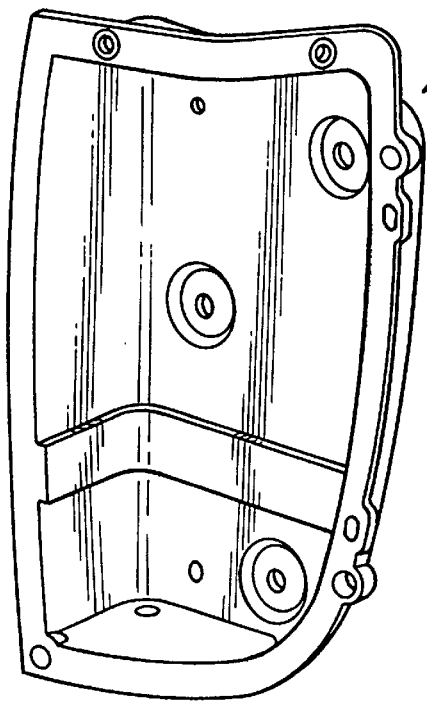
FIG. 9. is a detailed perspective view of a structural tail lamp support made in accordance with the teachings of the present invention.
Figure 10:
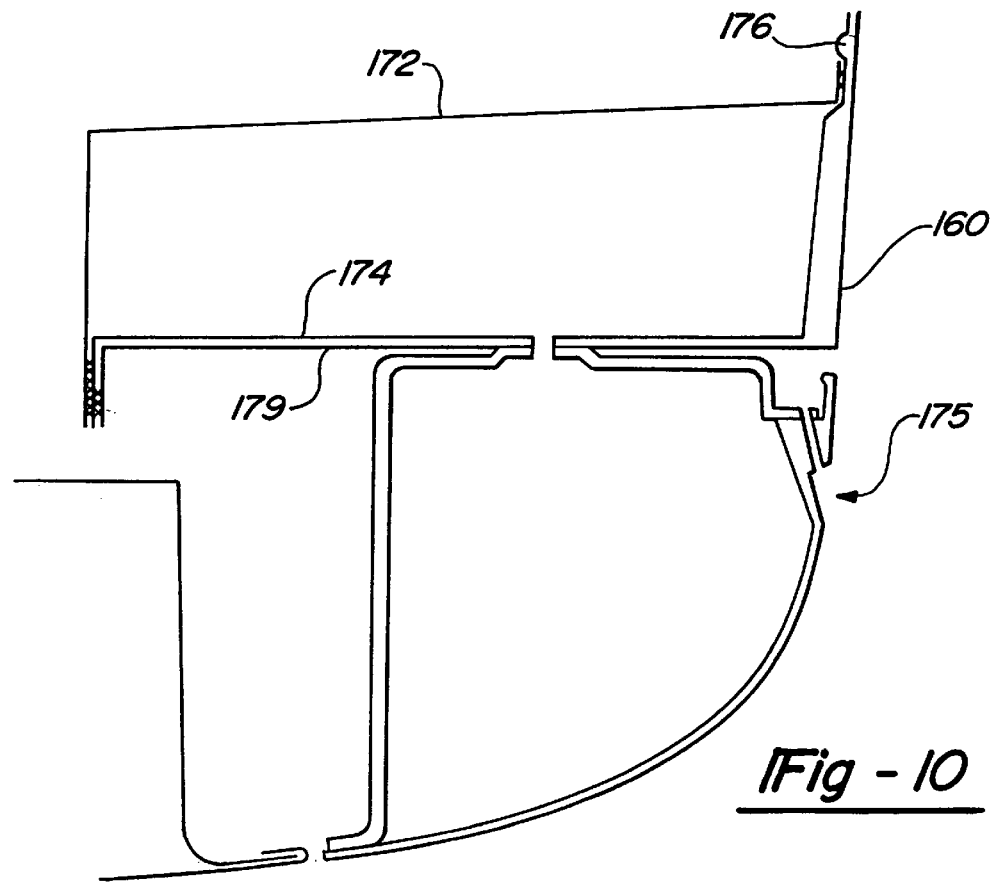
FIG. 10 is a section similar to that of FIG. 8 incorporating the structural tail lamp support of FIG. 9.

Alternately, the tail lamp support and extension plate subassembly need not be included at all and a structural tail lamp support assembly 175 (shown in FIGS. 9 and 10) can be attached directly to a rearward facing surface 179 of body side outer panel 160, still providing the same features and functions of moving the vertical pivot axis outboard in vehicle.

The lower hinge assembly 178 including first lower hinge crank 54 and first lower hinge base 180 are concealed from view by a lower door extension 182 which wraps around to the body side surface below the tail lamp assembly as shown in FIG. 3. The distance provided between the vertical pivot axis 36 and D-pillar structure 22 is sufficient to allow lower door extension 182 to pivot below the tail lamp support assembly 166 without contacting driver side D-pillar structure 22 whether in the selected open position or when pivoted to the 180° or greater angle.

Figure 11:
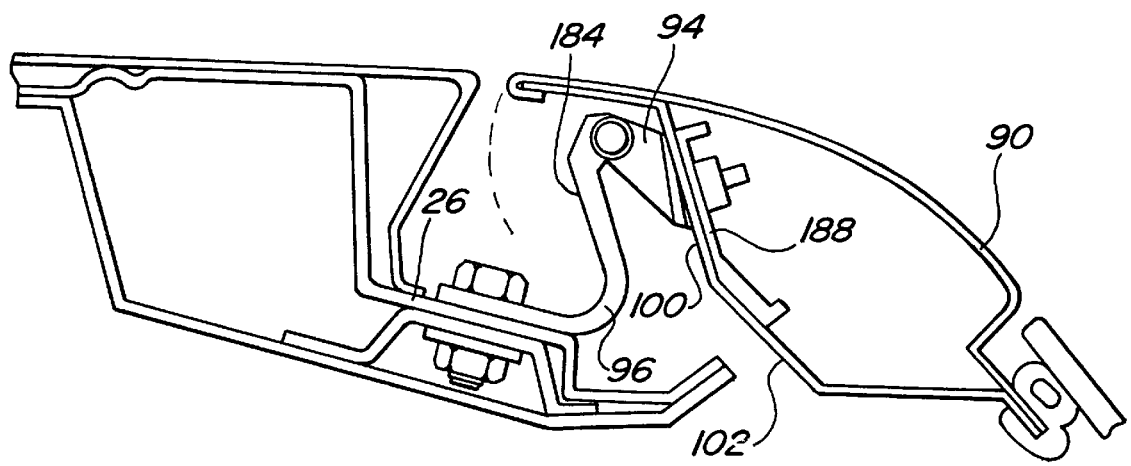
FIG. 11 is a cross section taken along line 11—11 in FIG. 1 showing a concealed hinge for a horizontal door member of the present invention.

As shown in FIG. 11, a horizontal hinge 186, including horizontal hinge crank 94 and horizontal hinge base 96, is provided along upper portion 102 of door member 90. As previously explained, hinge crank 94, is attached to the inner surface 100 of door member 90, while hinge base 96 is attached to rear header 26. Horizontal hinge 186 is concealed from view when door 90 is in the closed position as shown in FIG. 11. As shown, inner surface 100 provides a surface which coordinates with hinge crank 94 and also provides a weld or fastening attachment area 188 along upper portion 102 of surface 100.

When the door closure system of the present invention is in a closed position, the lower door extensions on the two horizontal doors conceal the lower hinge of each door while the upper hinge of each of the two horizontal doors is concealed by the lower edge of the horizontal door. Further the binges of the horizontal door are concealed as shown and described with reference to FIG. 11. As shown in FIG. 1, each hinge is located within the normal exterior surface of the vehicle body and is concealed from view when the closure system is in a closed position.

Further, the configuration of the present invention incorporates a method of concealing the door release handles which are traditionally visible from the exterior of the vehicle. In the present embodiment, a lock cylinder 200, generally positioned on a lower portion 202 of horizontal door member 90, can be actuated to release door member 90 from strikers 114. By raising door member 90 to an open position, primary door opening handle 80 can be accessed which is positioned on the upper edge 86 of door outer panel 76. By pivoting door member 64 to an open position, secondary door opening handle 50 can be accessed which is positioned on a second vertical side 56 of door outer panel 46. By actuating secondary door opening handle 50, door member 34 may be pivoted to an open position thereby providing all three doors in an open position while concealing the release handles for each when in a closed position. Further, the exposed door lock cylinder 200 can be removed if a key fob is used which transmits a signal to an electronic receiver (not shown) connected to a solenoid which can release door member 90 from strikers 114.

By incorporating the teachings of the present invention, the hinges of the closure system, as well as the release handles can be concealed therefore improving the aesthetic appearance and aerodynamic performance of the vehicle while at the same time allowing the automotive design stylist the freedom of design to incorporate a rear tumble home having an aggressive angle.

The foregoing discussion discloses and describes preferred embodiments of the present invention. One skilled in the art will readily recognize from such discussion, and from the accompanying drawings and claims, that various changes, modifications, and variations can be made therein without departure from the true spirit and fair scope of the invention as defined in the following claims.

What is claimed is:

1. A vehicle closure apparatus for covering an opening in a vehicle body, said apparatus comprising:
   a first vertical door member pivotable about a first vertical pivot axis passing through a first hinge attached to said first vertical door member;
   a second vertical door member pivotable about a second vertical pivot axis passing through a second hinge attached to said second vertical door member; and
   a horizontal door member pivotable about a horizontal pivot axis passing through a third hinge attached to said horizontal door members wherein said hinges are concealed from view when said door members are in a closed position, and wherein said first and second hinges allow said vertical door members to open more than 180°.

2. The apparatus of claim 1 wherein said first hinge and said second hinge have an integral door check device incorporated therein.

3. The apparatus of claim 2 wherein said integral door check device has a detent mechanism for retaining said first and second doors in a selected open position until a force greater than a predetermined threshold is exerted on said door member.

4. The apparatus of claim 3 wherein said detent mechanism may be overcome in an open direction causing said doors to open beyond said selected open position, said first and second hinges allowing said first and second doors to open to an angle greater than 180 degrees from said closed position for each of said first and second doors.

5. The apparatus of claim 1 wherein said first hinge and said second hinge are each further comprised of:
   a hinge base attached to a structure of said vehicle, said hinge base having a base attachment segment and a base arm segment, said base arm segment having a base pivot aperture therein;
   a hinge crank attached to a door member of said closure apparatus, said hinge crank having a crank attachment segment and a crank arm segment, said crank arm segment having a crank pivot aperture;
   a hinge pin pivotally connecting said hinge base and said hinge crank; and
   a door check device;
   wherein said hinge pin provides a pivot axis about which said base and said crank pivot relative to one another, said door check device providing a resistance to said hinge base and said hinge crank pivoting about said axis and retaining said hinge base and said hinge crank in a selected position until a force greater than a predetermined threshold is applied thereto.

6. The apparatus of claim 5 wherein a distal end of said crank arm segment provides a surface generally radiused about said pivot axis, said surface including a detent coordinated with a spring element of said door check device such that said spring element is biased toward said detent and engages said detent thereby resisting further pivotal movement between said hinge crank and said hinge base.

7. A hinge incorporated within a closure apparatus for a vehicle having an opening therein, said hinge being concealed when said apparatus is in a closed position, said hinge comprising:
   a hinge base attached to a structure of the vehicle, said hinge base having a base attachment segment and a base arm segment, said base arm segment having a base pivot aperture therein;
   a hinge crank attached to a door member of the vehicle, said hinge crank having a crank attachment segment and a crank arm segment, said crank arm segment having a crank pivot aperture therein;
   a hinge pin pivotally connecting said hinge base and said hinge crank; and
   a door check device;
   wherein said hinge pin provides a pivot axis about which said hinge base and said hinge crank pivot relative to one another more than 180°, said door check device providing a resistance to said hinge base and said hinge crank pivoting about said axis and retaining said hinge base and said hinge crank in a selected position until a force greater than a predetermined threshold is applied thereto.

8. The hinge of claim 7 wherein a distal end of said crank arm segment provides a surface generally radiused about said pivot axis, said surface including a detent coordinated with a spring element of said door check device such that said spring element is biased toward and engages said detent, thereby resisting further pivotal movement between said hinge crank and said hinge base.

9. The hinge of claim 8 wherein said spring element is a generally U-shaped spring element having a contact end biased to contact said radiused surface of said crank arm segment, said spring element further having an attachment end which is retained in a fixed position relative to said hinge base.

10. The hinge of claim 8 wherein said hinge base and said hinge crank are pivotable to an open position having an angle greater than 180° from said closed position when a force greater than said predetermined threshold is applied in an opening direction, said force overcoming the resistance to further pivotal movement between said hinge crank and said hinge base.

11. A vehicle closure apparatus for covering an opening of a vehicle body comprising:

a first vertical door member pivotably attached to a first vertical hinge on the vehicle body; and a second vertical door member pivotably attached to a second vertical hinge on the vehicle body;

wherein said hinges are located within the normal exterior of the vehicle body to conceal said hinges from outside view when said door members are in a closed position; and wherein said hinges are located at a predetermined distance from the vehicle body to allow uninhabited access to the full width of the opening of the vehicle body when said door members are in an open position.

12. A vehicle closure apparatus in claim 11, wherein said hinges are located at a predetermined distance from the vehicle body to allow said door members to open more than 180 degrees.

* * * * *